US012145764B2

(12) United States Patent
Suzuki

(10) Patent No.: US 12,145,764 B2
(45) Date of Patent: Nov. 19, 2024

(54) PREFORM, SYNTHETIC RESIN CONTAINER, AND METHOD FOR MANUFACTURING SYNTHETIC RESIN CONTAINER

(71) Applicant: YOSHINO KOGYOSHO CO., LTD., Tokyo (JP)

(72) Inventor: Takanori Suzuki, Tokyo (JP)

(73) Assignee: YOSHINO KOGYOSHO CO., LTD., Tokyo (JP)

(*) Notice: Subject to any disclaimer, the term of this patent is extended or adjusted under 35 U.S.C. 154(b) by 217 days.

(21) Appl. No.: 17/634,088

(22) PCT Filed: Jul. 14, 2020

(86) PCT No.: PCT/JP2020/027412
§ 371 (c)(1),
(2) Date: Feb. 9, 2022

(87) PCT Pub. No.: WO2021/029175
PCT Pub. Date: Feb. 18, 2021

(65) Prior Publication Data
US 2022/0315268 A1      Oct. 6, 2022

(30) Foreign Application Priority Data
Aug. 9, 2019   (JP) .................. 2019-148052

(51) Int. Cl.
*B65D 1/02*   (2006.01)
*B29C 49/22*  (2006.01)
*B29L 31/00*  (2006.01)

(52) U.S. Cl.
CPC .............. *B65D 1/023* (2013.01); *B29C 49/22* (2013.01); *B65D 1/0215* (2013.01); *B29L 2031/7158* (2013.01); *B65D 2501/0027* (2013.01)

(58) Field of Classification Search
CPC ........ B65D 1/023; B65D 1/0215; B29C 49/22
USPC ........................................................ 215/12.2
See application file for complete search history.

(56) References Cited

U.S. PATENT DOCUMENTS 6,315,967 B1   11/2001  Potter et al.

FOREIGN PATENT DOCUMENTS

CN   1473102 A  *  2/2004  ......... B29C 45/1684
EP   2508319 A1    10/2012
(Continued)

OTHER PUBLICATIONS

Jul. 14, 2023 Extended European Search Report Issued in European Patent Application No. 20853295.2.
(Continued)

*Primary Examiner* — J. Gregory Pickett
*Assistant Examiner* — Niki M Eloshway
(74) *Attorney, Agent, or Firm* — Oliff PLC

(57) ABSTRACT

A preform, a synthetic resin container, and a method for manufacturing a synthetic resin container in which an air passage leading from an ambient air introduction hole to a trunk can be easily preserved. In the mouth, the inner body includes a large-diameter portion provided at an upper end thereof, and a small-diameter portion continuously extending below the large-diameter portion via a connecting portion. In the mouth, the outer body is provided with an ambient air introduction hole passing through the outer body, and a neck ring positioned within a height range of the small-diameter portion. The inner body is made of a crystalline resin, and a crystallized region is formed in part of the inner body, the crystallized region having a higher degree of crystallization than other regions.

5 Claims, 4 Drawing Sheets

(56) References Cited

FOREIGN PATENT DOCUMENTS

| JP | 05031790 A | * | 2/1993 | ....... B05B 11/00412 |
|----|------------|---|--------|-----------------------|
| JP | 2017-196822 A | | 11/2017 | |
| JP | 2019-81604 A | | 5/2019 | |
| JP | 2019081604 A | * | 5/2019 | ....... B05B 11/00412 |
| JP | 2019-112089 A | | 7/2019 | |
| JP | 2019-119476 A | | 7/2019 | |
| JP | 2020152427 A | * | 9/2020 | |
| WO | 2018/186334 A1 | | 10/2018 | |
| WO | WO-2019087515 A1 | * | 5/2019 | ....... B05B 11/00412 |

OTHER PUBLICATIONS

Feb. 26, 2024 Office Action issued in Canadian Application No. 3,147, 199.

Feb. 8, 2022 International Preliminary Report on Patentability issued in Patent Application No. PCT/JP2020/027412.

Nov. 8, 2022 Office Action issued in Japanese Patent Application No. 2019-148052.

Jan. 18, 2024 Office Action Issued in Korean Patent Application No. 10-2022-7004245.

Oct. 6, 2020 International Search Report issued in International Patent Application No. PCT/JP2020/027412.

Mar. 28, 2023 Office Action Issued in Japanese Patent Application No. 2019-148052.

Apr. 5, 2023 Office Action Issued in Canadian Patent Application No. 3,147,199.

Apr. 24, 2023 Office Action Issued in Chinese Patent Application No. 202080056204.0.

Jul. 16, 2024 Office Action issued in Japanese Application No. 2019-148052.

Sep. 19, 2024 Office Action issued in Korean Application No. 10-2022-7004245.

* cited by examiner

Detail of portion A

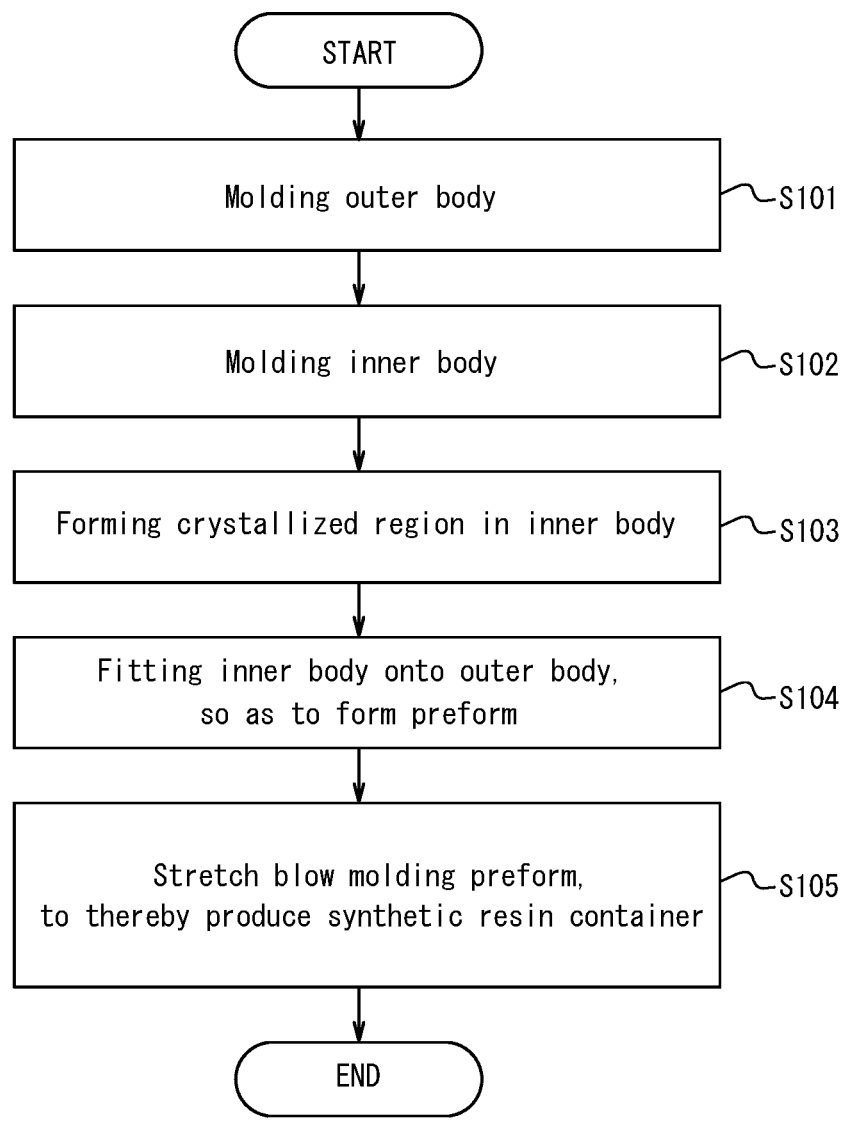

PREFORM, SYNTHETIC RESIN CONTAINER, AND METHOD FOR MANUFACTURING SYNTHETIC RESIN CONTAINER

CROSS-REFERENCE TO RELATED APPLICATION

This application claims priority to Japanese Patent Application No. 2019-148052, filed on Aug. 9, 2019, the entire contents of which are incorporated herein by reference.

TECHNICAL FIELD

The present disclosure relates to a preform including an outer layer body and an inner layer body separably laminated on an inner surface of the outer layer body, a synthetic resin container, and a method for manufacturing a synthetic resin container.

BACKGROUND

Containers with separable laminated layers, which are also referred to as delamination containers, are conventionally known as containers for storing food seasonings such as soy sauce, beverages, cosmetics such as skin lotion, and toiletries such as shampoo and conditioner or liquid soap (for example, Patent Literature 1).

Such a container with separable laminated layers has a double-layer structure in which an inner layer body is separably laminated on an inner surface of an outer layer body. The outer layer body includes a tubular mouth, a trunk continuous with the mouth, and a bottom that closes a lower end of the trunk, and the outer layer body defines an outer shell of the container. The inner layer body has a container space for a content liquid and is capable of undergoing volume reduction and deformation. Such a container with separable laminated layers is used, for example, as a squeeze-type dispensing container combined with a dispensing cap provided with a check valve, or a pump container combined with a pump. In this case, a content liquid can be dispensed to the outside, by squeezing (compressing) the trunk of the outer layer body or by operating the pump. After dispensing, on the other hand, ambient air is introduced between the inner layer body and the outer layer body through an ambient air introduction hole provided in the outer layer body, and the outer layer body can be maintained in its original shape while the inner layer body has undergone volume reduction and deformation. Thus, in the container with separable laminated layers, the content liquid contained in the inner layer body can be dispensed without having to replace it with ambient air. This reduces contact between the content liquid contained in the inner layer body with the ambient air, thereby preventing deterioration and change in quality of the content liquid.

The above container with separable laminated layers can be manufactured by stretch blow molding a double-layer preform in which an inner preform that is to form the inner layer body and an outer preform that is to form the outer layer body are combined.

CITATION LIST

Patent Literature

PTL 1: 2017-196822 A

SUMMARY

Technical Problem

Incidentally, in a case in which a container with separable laminated layers manufactured by stretch blow molding the aforementioned double-layer preform has an ambient air introduction hole in the mouth, part of the inner preform in the vicinity of the ambient air introduction hole that is not to be stretched can expand radially outward during the blow molding. This sometimes blocks an air passage leading from the ambient air introduction hole to a space in the trunk between the outer layer body and the inner layer body, therefore leaving room for improvement.

It would be helpful to provide a preform, a synthetic resin container, and a method for manufacturing a synthetic resin container in which an air passage leading from an ambient air introduction hole to a trunk can be easily preserved.

Solution to Problem

One aspect of the present disclosure resides in a synthetic resin preform that includes an outer body and an inner body laminated on an inner surface of the outer body and that is used for stretch blow molding, the synthetic resin preform including:
  a tubular mouth;
  a trunk positioned below the mouth; and
  a bottom that closes a lower end of the trunk, wherein
  in the mouth, the inner body includes a large-diameter portion provided at an upper end thereof, and a small-diameter portion continuously extending below the large-diameter portion via a connecting portion,
  in the mouth, the outer body is provided with an ambient air introduction hole passing through the outer body, and a neck ring positioned within a height range of the small-diameter portion,
  the inner body is made of a crystalline resin, and a crystallized region is formed in part of the inner body, the crystallized region having a higher degree of crystallization than other regions,
  the crystallized region has an upper end that is positioned within a height range extending between an upper end of the connecting portion and an upper end of the neck ring, and
  the crystallized region has a lower end that is positioned below the neck ring.

In a preferred embodiment of the synthetic resin preform configured as above, the upper end of the crystallized region is positioned within the height range of the small-diameter portion and above the neck ring.

In another preferred embodiment of the synthetic resin preform configured as above, the ambient air introduction hole is provided within the height range of the small-diameter portion and above the neck ring, and the upper end of the crystallized region is located at a height position between a lower end of the ambient air introduction hole and the upper end of the neck ring.

In still another preferred embodiment of the synthetic resin preform configured as above, the small-diameter portion is provided with airflow ribs that are formed intermittently in a circumferential direction and that protrude radially outward.

In still another preferred embodiment of the synthetic resin preform configured as above, one of an outer surface of the large-diameter portion and the inner surface of the outer body is provided with an annular projection, another one of the outer surface of the large-diameter portion and the inner surface of the outer body is provided with an annular groove that faces the annular projection, and the inner body is configured to be positioned relative to the outer body in a vertical direction by engagement between the annular projection and the annular groove.

In still another preferred embodiment of the synthetic resin preform configured as above, the crystallized region is an unstretched part in the stretch blow molding.

Another aspect of the present disclosure resides in a synthetic resin container that includes an outer layer body and an inner layer body separably laminated on an inner surface of the outer layer body and that is formed by stretch blow molding, the synthetic resin container including:
 a tubular mouth;
 a trunk positioned below the mouth; and
 a bottom that closes a lower end of the trunk, wherein
 in the mouth, the inner layer body includes a large-diameter portion provided at an upper end thereof, and a small-diameter portion continuously extending below the large-diameter portion via a connecting portion,
 in the mouth, the outer layer body is provided with an ambient air introduction hole passing through the outer layer body, and a neck ring positioned within a height range of the small-diameter portion,
 the inner layer body is made of a crystalline resin, and a crystallized region is formed in part of the inner layer body, the crystallized region having a higher degree of crystallization than other regions,
 the crystallized region has an upper end that is positioned within a height range extending between an upper end of the connecting portion and an upper end of the neck ring, and
 the crystallized region has a lower end that is positioned below the neck ring.

Yet another aspect of the present disclosure resides in a method for manufacturing a synthetic resin container by stretch blow molding a preform including an outer body and an inner body laminated on an inner surface of the outer body, the preform having a tubular mouth, and a trunk positioned below the mouth, and a bottom that closes a lower end of the trunk, wherein
 in the mouth, the inner body includes a large-diameter portion provided at an upper end thereof, and a small-diameter portion continuously extending below the large-diameter portion via a connecting portion, and
 in the mouth, the outer body is provided with an ambient air introduction hole passing through the outer body, and a neck ring positioned within a height range of the small-diameter portion, the method including:
 molding the outer body and the inner body that is made of a crystalline resin;
 reheating and cooling part of the inner body, to thereby form a crystallized region having a higher degree of crystallization than other regions;
 fitting the inner body with the crystallized region onto an inner peripheral surface of the outer body, to thereby form a preform; and
 stretch blow molding the preform, to thereby form a synthetic resin container, wherein
 the crystallized region has an upper end that is positioned within a height range extending between an upper end of the neck ring and an upper end of the connecting portion, and
 the crystallized region has a lower end that is positioned below the neck ring.

In a preferred embodiment of the method for manufacturing a synthetic resin container configured as above, the cooling of the inner body incudes cooling at least part of the mouth in the inner body by slow cooling without forced cooling.

Advantageous Effect

According to the present disclosure, a preform, a synthetic resin container, and a method for manufacturing a synthetic resin container in which an air passage leading from an ambient air introduction hole to a trunk can be easily preserved are provided.

BRIEF DESCRIPTION OF THE DRAWINGS

In the accompanying drawings:
FIG. 4 is a flowchart illustrating a procedure of a method for manufacturing a synthetic resin container according to an embodiment of the present disclosure.

DETAILED DESCRIPTION

Hereinafter, the present disclosure will be described by way of illustration in more details with reference to the drawings.

Figure 1:
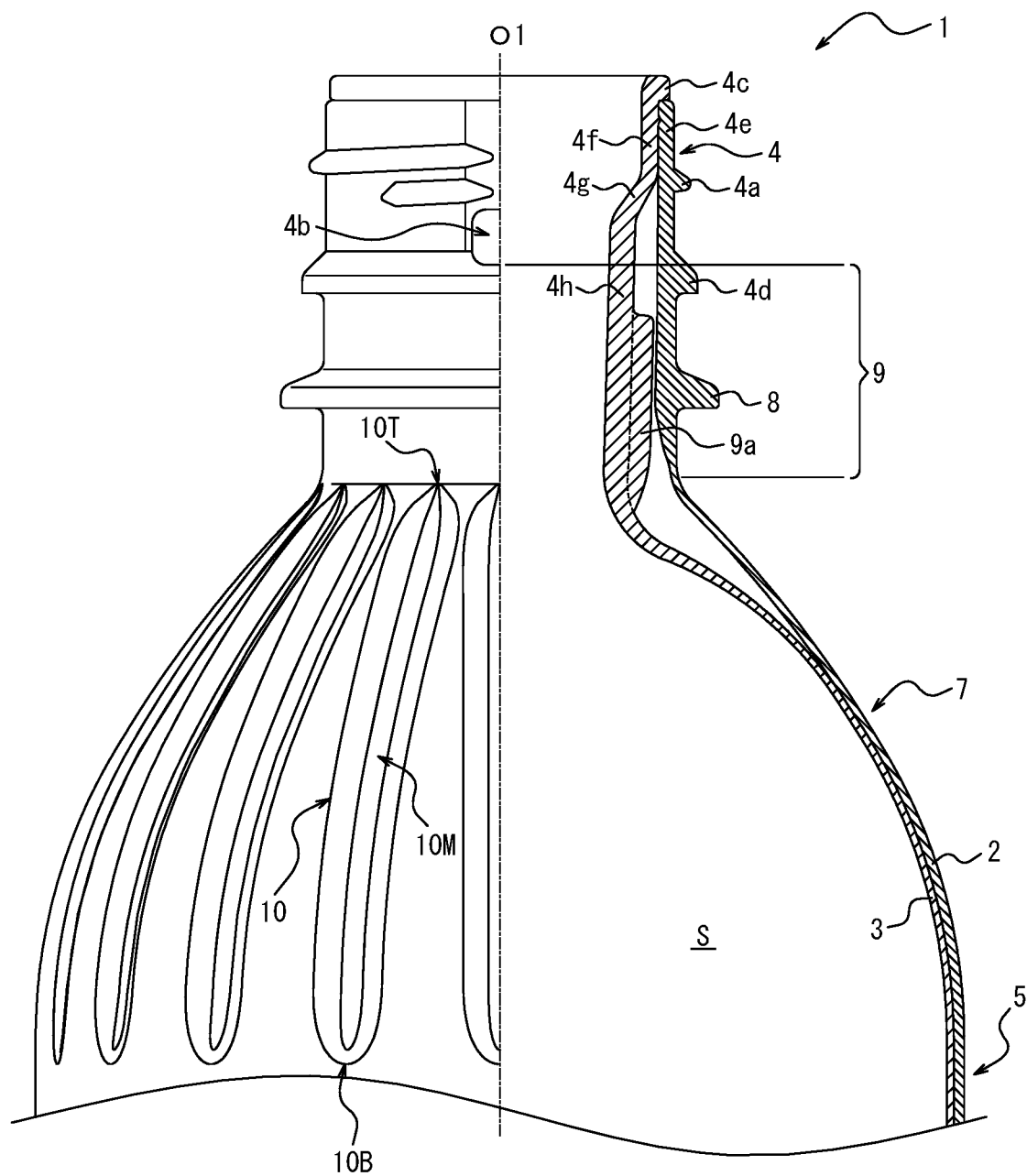
FIG. 1 is an enlarged half-sectional front view illustrating a synthetic resin container according to an embodiment of the present disclosure.

A synthetic resin container 1 in FIG. 1 according to an embodiment of the present disclosure is also referred to as a container with separable laminated layers or a delamination container, with a double-layer structure including an outer layer body 2 and an inner layer body 3. The synthetic resin container 1 has a bottle-shape appearance including a cylindrical mouth 4, a shoulder 7 that is positioned below the mouth 4 and that has a diameter increasing downward, a cylindrical trunk 5 continuously extending below the shoulder 7, a bottom (which is not illustrated) closing a lower end of the trunk 5.

In the present specification, claims, and drawings, a vertical direction refers to an upward direction and a downward direction in a state in which the synthetic resin container 1 is in an upright position as illustrated in FIG. 1. Furthermore, radially outward refers to a direction toward an outer side along a straight line that passes a central axis O1 of the synthetic resin container 1 and that is perpendicular to the central axis O1 in FIG. 1, and radially inward refers to a direction toward the central axis O1 along the straight line.

In the mouth 4, the outer layer body 2 includes a peripheral wall 4e provided with a male screw 4a. A dispensing member, such as a dispensing cap or a dispensing pump, can be mounted to the mouth 4, by being screw-connected to the male screw 4a. Additionally, the mouth 4 may be configured to include a ring-shaped projection (e.g., a bead 4d in FIG. 1), instead of or in addition to the male screw 4a, so that the mouth 4 can be plugged by a dispensing member, such as a dispensing cap, mounted thereto by undercut engagement. The mouth 4 is provided, in a lower part thereof, with a neck ring 8, which is used to fix the mouth 1 to a blow molding mold when the synthetic resin container 1 is stretch blow molded, for example.

As illustrated in FIG. 1, in the mouth 4, the inner layer body 3 includes a large-diameter portion 4f provided at an upper end thereof, and a small-diameter portion 4h continuously extending below the large-diameter portion 4f via a connecting portion 4g. The connecting portion 4g has a truncated conical shaped side face that decreases in diameter downward. Furthermore, the inner layer body 3 (large-diameter portion 4f) is provided, at an opening portion provided at the upper end thereof, with a ring-shaped flange 4c protruding radially outward. By the flange 4c being laid along (placed on) an open end of the outer layer body 2, the opening portion of the inner layer body 3 is fixed to the open end. In a height region in which the small-diameter portion 4h is formed, a gap is provided between the outer layer body 2 and the inner layer body 3, and airflow ribs 9a are also formed to protrude radially outward from an outer surface of the small-diameter portion 4h. The airflow ribs 9a are intermittently formed in a circumferential direction, so that air can pass through between the airflow ribs 9a. Although in the example of FIG. 1 the airflow ribs 9a are provided to protrude radially outward from the small-diameter portion 4h of the inner layer body 3 in the mouth 4, the present disclosure is not limited to this example. For example, the airflow ribs 9a may be configured to extend further upward than is illustrated in the example of FIG. 1, so as to be continuous with the connecting portion 4g.

In the present embodiment, a slight gap is formed between an inner surface of the outer layer body 2 and an outer peripheral end of each airflow rib 9a. Providing the gap in this way facilitates ambient air that has been introduced through the ambient air introduction hole 4b to pass into the space between the outer layer body 2 and the inner layer body 3 in the trunk 5. Additionally, the outer peripheral end of each airflow rib 9a may also be configured to abut against the outer layer body 2.

Hereinafter, a case in which the synthetic resin container 1 is used as a squeeze-type dispensing container will be described by way of illustration.

The outer layer body 2 defines an outer shell of the synthetic resin container 1 and can be made of a synthetic resin material, such as polyethylene terephthalate (PET), polypropylene (PP), or polyethylene (PE). In the present embodiment, the outer layer body 2 is made of polyethylene terephthalate. Part of the outer layer body 2 that corresponds to the trunk 5 is flexible, and it can be squeezed (compressed) and depressed and can also be restored to its original shape from a depressed state. In a case in which the synthetic resin container 1 is used as a pump container, part of the outer layer body 2 that corresponds to the trunk 5 is not necessarily formed to be squeezable.

The inner layer body 3 can be formed in a bag shape having a thickness smaller than that of the outer layer body 2 using a synthetic resin material, such as polyethylene terephthalate, polyamide (nylon), or ethylene-vinyl alcohol copolymer resin (EVOH), which is a crystalline resin. The inner layer body 3 is separably laminated on the inner surface of the outer layer body 2. In the present embodiment, the inner layer body 3 is made of polyethylene terephthalate, as is the case with the outer layer body 2. The thickness of the inner layer body 3 may be configured to be larger than that of the outer layer body 2. In the inner layer body 3, there is defined a container portion S that communicates with an opening of the mouth 4. For example, food seasonings such as soy sauce, beverages, cosmetics such as skin lotion, or toiletries such as shampoo and conditioner or liquid soap can be stored in the container portion S as the contents. It is to be noted that separation of the inner layer body 3 from the inner surface of the outer layer body 2 may be any of separation from a bonded state, separation from a quasi-bonded state in the case of laminated resin articles having no compatibility, and separation from a close contact state.

A crystalline resin constituting the inner layer body 3 is a resin which is categorized as a thermoplastic resin and has crystalline regions in which molecular chains are regularly ordered. A crystalline resin contains both crystalline and amorphous regions, and the ratio of the both regions depends on, for example, a cooling rate at which the crystalline resin is cooled after heating. In general, the ratio of crystallized regions in a crystalline resin increases when it is slowly cooled after heating. A crystalline resin in which the ratio of crystallized regions is high, that is, a crystalline resin having a high degree of crystallization has a low light transmittance due to the occurrence of light diffusion and reflection caused by the difference in refractive index between crystalline regions and amorphous regions. A crystalline resin having a high degree of crystallization tends to have high rigidity. The degree of crystallization can be measured, for example, using a density method, an X-ray diffraction method, a method based on differential scanning calorimeter (DSC), an FT-IR method, a solid-state NMR method, or the like.

As illustrated in FIG. 1, in the mouth 4, the outer layer 2 is provided with the ambient air introduction hole 4b through which ambient air is introduced between the outer layer 2 and the inner layer 3. Preferably, the ambient air introduction hole 4b is configured to have a check valve function, or the ambient air introduction hole 4b has a check valve attached thereto so as to configured to allow ambient air to be introduced between the outer layer 2 and the inner layer 3, while preventing air between the outer layer 2 and the inner layer 3 from flowing to the outside. The ambient air introduction hole 4b may, however, be configured not to have a check valve or not to have a check valve function. Additionally, the shape of the ambient air introduction hole 4b is not limited to a substantially rectangular shape as illustrated, and various other shapes, such as a circular or elliptical shape, can be adopted.

The synthetic resin container 1 with the above configuration can form a dispensing container, in a case in which a dispensing member, such as a dispensing cap, is mounted onto the mouth 4. In this case, by squeezing (compressing) part of the outer layer body 2 that corresponds to the trunk 5, the contents can be dispensed through the dispensing member. In conjunction with dispensing of the contents, the inner layer body 3 separates from the inner surface of the outer layer body 2 and undergoes volume reduction and deformation. Once the squeeze is released, ambient air is introduced between the outer layer body 2 and the inner layer body 3 through the ambient air introduction hole 4b provided in the outer layer 2, so that the outer layer body 2 is restored to the original shape while the inner layer body 3 has undergone volume reduction and deformation. Thus, the contents contained in the container portion S can be dispensed without having to replace it with ambient air. Accordingly, contact between the contents contained in the container portion S with ambient air can be reduced, and deterioration and change in quality of the contents can be prevented.

As illustrated in FIG. 1, the synthetic resin container 1 according to the present disclosure includes a crystallized region 9 within a height range along the mouth 4 that extends from a lower end of the ambient air introduction hole 4b to a predetermined height below the neck ring 8. The crystallized region 9 is a region having a low light transmittance as a result of the degree of crystallization having been increased to the extent where whitening occurs in the inner layer body 3 in the region (by thermal crystallization).

The synthetic resin container 1 is formed by fixing a neck ring 18 of a preform 11 (refer to FIG. 2), which corresponds to the neck ring 8 in FIG. 1, to a blow molding mold and stretch blow molding the preform 11. Here, a region in the mouth 4 that is not to be stretched tends to expand radially outward due to high pressure air coming from the inside during stretch blow molding. In that case, sometimes an air passage formed between the outer layer body 2 and the inner layer body 3 can be blocked, thus preventing movement of air through the ambient air introduction hole 4b into the space between the outer layer body 2 and the inner layer body 3 in the trunk 5. In the present embodiment, the degree of crystallization in the crystallized region 9 illustrated in FIG. 1 has been increased to the extent where whitening occurs in the inner layer body 3, so that high elastic modulus and high rigidity can be achieved. Consequently, deformation of the inner layer body 3 in the crystallized region 9 during stretch blow molding can be prevented, and therefore, air is not blocked from moving into the trunk 5 through the ambient air introduction hole 4b. Herein, "whitening" refers to a state in which light transmittance has decreased as a result of an increase in the degree of crystallization in a crystalline resin as mentioned above, and a resulting color is not limited to white.

In the present embodiment, as illustrated in FIG. 1, the crystallized region 9 is configured to be provided within the height range extending from the lower end of the ambient air introduction hole 4b to the predetermined height below the neck ring 8. This configuration enables it to easily preserve an air flow path between the outer layer body 2 and the inner layer body 3 over the height region extending from the ambient air introduction hole 4b to below the neck ring 8, when the outer layer body 2 is restored by ambient air introduced through the ambient air introduction hole 4b. The present disclosure is, however, not limited to this example. The crystallized region 9 may be configured such that an upper end of the crystallized region 9 is positioned within a height range extending between an upper end of the connecting portion 4g and an upper end of the neck ring 8. With this configuration, the crystallized region 9 can be provided at least over a height region extending from the upper end of the neck ring 8 to the predetermined height below the neck ring 8. Accordingly, rigidity of the inner layer body 3 is increased in the unstretched region below the neck ring 8 that tends to expand radially outward due to high pressure air coming from the inside during stretch blow molding, whereby its radially outward expansion can be prevented. Furthermore, because the upper limit for the upper end of the crystallized region 9 is set to be the upper end of the connecting portion 4g, crystallization of a flange 14c and an annular projection 14f1 (refer to FIG. 3) in the preform 11 is prevented, whereby fitting properties between the outer layer body 2 and the inner layer body 3 can be improved. That is, insertion of the inner body 13 with respect to the outer body 12 is easier, and adhesion (sealing) properties in the large-diameter portion 14f can also be achieved. Additionally, a lower end of the crystallized region 9 may extend beyond the lower end of the mouth 4 to the shoulder 7.

Preferably, the upper end of the crystallized region 9 is within a height range of the small-diameter portion 4h and above the neck ring 8. With this configuration, the upper limit of the crystallized region 9 can be set within the height range of the small-diameter portion 4h. Accordingly, crystallization of the flange 14c and the annular projection 14f1 (refer to FIG. 3) in the preform 11 is further prevented, whereby fitting properties between the outer layer body 2 and the inner layer body 3 can be improved.

More preferably, the ambient air introduction hole 4b is provided within the height range of the small-diameter portion 4h and above the neck ring 8, and the upper end of the crystallized region 9 is configured to be located at a height position between the lower end of the ambient air introduction hole 4b and the upper end of the neck ring 8. With this configuration, the upper limit for the crystallized region 9 can be limited to be within a region extending below the lower end of the ambient air introduction hole 4b. Accordingly, crystallization of the flange 14c and the annular projection 14f1 (refer to FIG. 3) in the preform 11 is prevented even more effectively, whereby fitting properties between the outer layer body 2 and the inner layer body 3 can be improved.

In the present embodiment, the crystallized region 9 has a higher elastic modulus than other regions, and the crystallized region 9 resists stretching during stretch blow molding. Thus, an air passage in the gap between the outer body 12 and the inner body 13 can be preserved. If the crystallized region 9 is not provided, stretching occurs in the vicinity of the neck ring 18 during stretch blow molding, and therefore the air passage in the gap between the outer body 12 and the inner body 13 is blocked.

The shoulder 7 in the synthetic resin container 1 is provided with at least one longitudinal rib 10 extending in the vertical direction, as illustrated in FIG. 1. Each longitudinal rib 10 extends downward from an upper end of the shoulder 7. Owing to the longitudinal ribs 10 provided in the shoulder 7, a gap is formed between the inner layer body 3 and the outer layer body 2 in a region surrounding each longitudinal rib 10, after an initial separation process for separating the inner layer body 3 from the outer layer body 2 using a method such as blowing air into the ambient air introduction hole 4b and for restoring the inner layer body 3 to the original shape by injecting air from the upper end opening of the mouth 4. Due to the gap formed between the inner layer body 3 and the outer layer body 2 in the region surrounding each longitudinal rib 10, ambient air can be easily introduced between the inner layer body 3 and the outer layer body 2 through the ambient air introduction hole 4b via the gap during use (when the contents are dispensed).

In the present embodiment, in particular, the crystallized region 9 and an upper end 10T of each longitudinal rib 10 are continuously formed, as illustrated in FIG. 1. Accordingly, ambient air that has been introduced through the ambient air introduction hole 4b can easily reach the longitudinal ribs 10, with the air passage being preserved between the outer layer body 2 and the inner layer body 3 in the crystallized region 9. The ambient air that has reached the longitudinal ribs 10 can easily reach the trunk 5 through the gap formed between the outer layer body 2 and the inner layer body 3 in the longitudinal ribs 10, thus allowing smooth contraction of the inner layer body 3.

Additionally, in the present embodiment, the height of the lower end of the crystallized region 9 is approximately the same as the height of the upper end 10T of each longitudinal rib 10, as illustrated in FIG. 1. The present disclosure is, however, not limited to this example. The crystallized region 9 and each longitudinal rib 10 may overlap each other in their height direction. Each longitudinal rib 10 and the crystallized region 9 may be spaced apart in their height direction, or the longitudinal ribs 10 may even be omitted.

Although in the present embodiment the longitudinal ribs 10 are arranged at an equal interval in the circumferential direction, the number, length, or the like of longitudinal ribs 10 may be changed in various ways.

In the present embodiment, each vertical rib 10 is formed as a concave rib that extends in the vertical direction and that curves toward the inner side of the container. In parts of the container that are provided with the vertical ribs 10, the inner layer body 3 has a concave rib shape corresponding to the shape of the outer layer body 2.

Each vertical rib 10 has a groove depth that is smaller in the upper end 10T and lower end 10B compared to its mid-height 10M in the vertical direction. By making the groove depth smaller in the upper end 10T and the lower end 10B, the inner layer body 3 can easily separate from the outer layer body 2 at the vertical ribs 10 in the initial separation process.

In the synthetic resin container 1 according to the present embodiment, the groove depth of each vertical rib 10 is reduced in the upper end 10T and the lower end 10B, and the inner layer body 3 can easily separate from the outer layer body 2 at the upper end 10T or the lower end 10B. Thus, a process of separating the inner layer body 3 from the outer layer body 2 and the subsequent process of restoring the inner layer body 3 to the original shape can be performed smoothly, and a desired gap can be easily formed between the inner layer body 3 and the outer layer body 2 at the position of the vertical rib 10.

As illustrated in FIG. 1, each vertical rib 10 has a width (groove width at a portion that is open to an outer surface of the shoulder 7 in a direction perpendicular to the direction in which the vertical rib 10 extends) that is smaller in the upper end 10T and the lower end 10B, thus having a tapered shape. With this configuration, separability of the inner layer body 3 at each vertical rib 10 can be further increased.

Each vertical rib 10 may be a convex rib protruding from the surface of the shoulder 7 toward the outside of the container. In this case, each vertical rib 10 preferably has a protrusion height that is smaller at least in the upper end 10T or the lower end 10B compared to the mid-height 10M. In this case, the sectional shape of each vertical rib 10 in the inner layer body 3 is a convex shape corresponding to the convex shape in the outer layer body 2.

Figure 2:
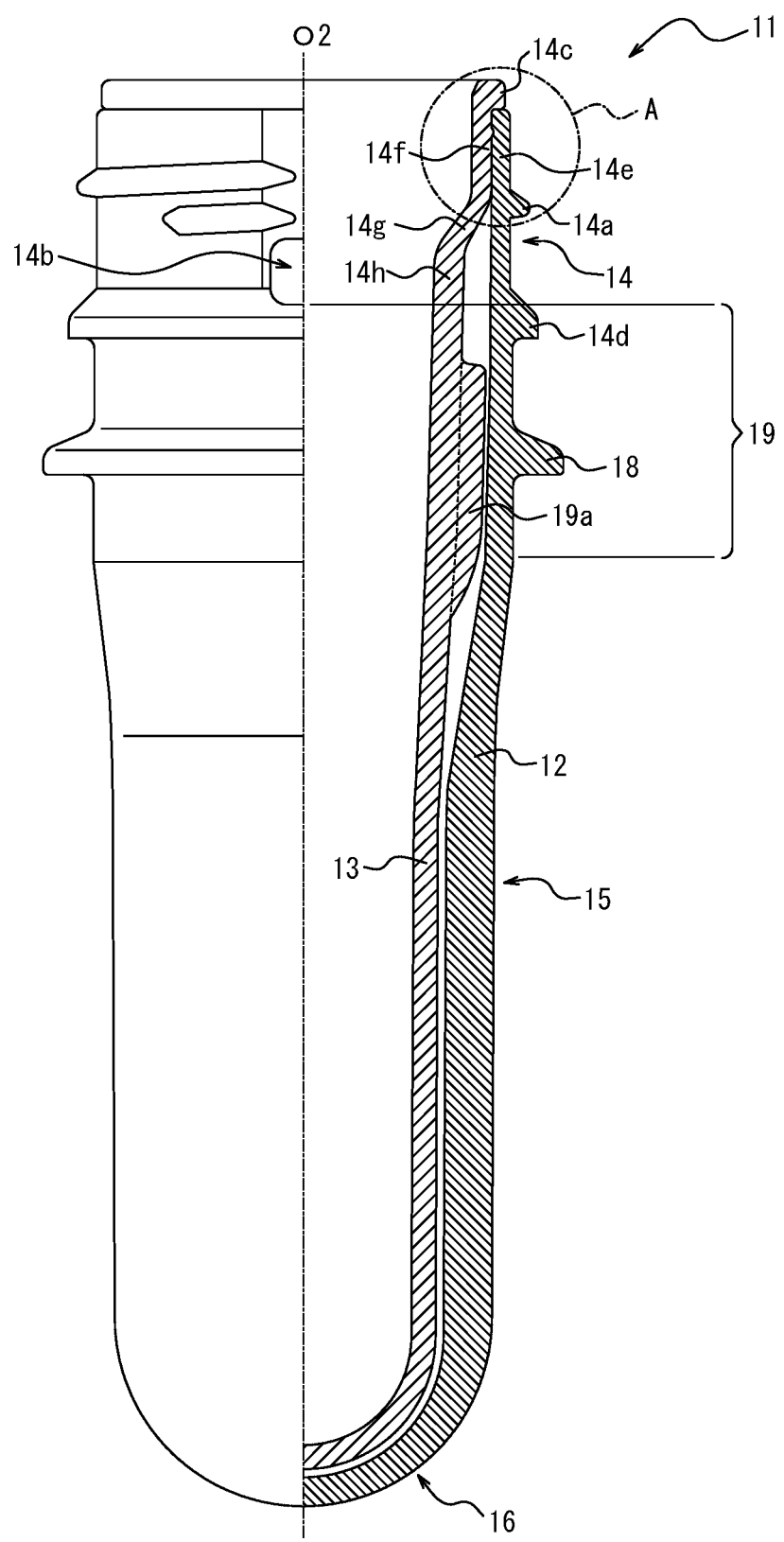
FIG. 2 is a half-sectional front view illustrating a preform according to an embodiment of the present disclosure.

The synthetic resin container 1 can be formed by stretch blow molding the synthetic resin preform 11 in FIG. 2 according to an embodiment of the present disclosure.

The preform 11 has a double-layer structure including a synthetic resin outer body 12, which is to form the outer layer body 2, and a synthetic resin inner body 13, which is to form the inner layer body 3. In appearance, the preform 11 has a bottomed tubular shape (substantially test tube shape) including a cylindrical mouth 14, a cylindrical trunk 15 continuously extending below the mouth 14, and a bottom 16 closing a lower end of the trunk 15. The mouth 14 is formed in a shape corresponding to the mouth 4 of the synthetic resin container 1, and has a male screw 14a and an ambient air introduction hole 14b passing through the outer body 12. The bottom 16 is formed in a curved shape (semispherical shape). The inner body 13 is provided, at an opening portion provided at an upper end thereof, with a ring-shaped flange 14c protruding radially outward. By the flange 14c being laid along (placed on) an open end of the outer body 12, the opening portion of the inner body 13 is fixed to the open end. Additionally, reference numeral O2 denotes a central axis that is common to the mouth 14, the trunk 15, and the bottom 16.

As illustrated in FIG. 2, in the mouth 14, the inner body 13 includes a large-diameter portion 14f provided at an upper end, and a small-diameter portion 14h continuously extending below the large-diameter portion 14f via a connecting portion 14g. The connecting portion 14g has a truncated conical shaped side face that decreases in diameter downward. In a height region in which the small-diameter portion 14h is formed, a gap is provided between the outer body 12 and the inner body 13, and airflow ribs 19a are also formed to protrude radially outward from an outer surface of the small-diameter portion 14h. The air flow ribs 19a are intermittently formed in the circumferential direction, so that air can pass through between the airflow ribs 19a. Although in the example of FIG. 2 the airflow ribs 19a are provided to protrude radially outward from the small-diameter portion 14h of the inner body 13 in the mouth 14, the present disclosure is not limited to this example. For example, the airflow ribs 19a may be configured to extend further upward than is illustrated in the example of FIG. 2, so as to be continuous with the connecting portion 14g.

In the present embodiment, a slight gap is formed between an inner surface of the outer body 12 and an outer peripheral end of each airflow rib 19a. By providing the gap in this way, even when the inner body 13 expands radially outward during stretch blow molding of the preform 11, the space formed with respect to the outer body 12 is unlikely to be blocked. This in turn facilitates ambient air that has been introduced through the ambient air introduction hole 4b to pass into the space between the outer layer body 2 and the inner layer body 3 in the trunk 5 of the synthetic resin container 1 in FIG. 1. Additionally, the outer peripheral end of each airflow rib 19a may also be configured to abut against the outer body 12.

Figure 3:
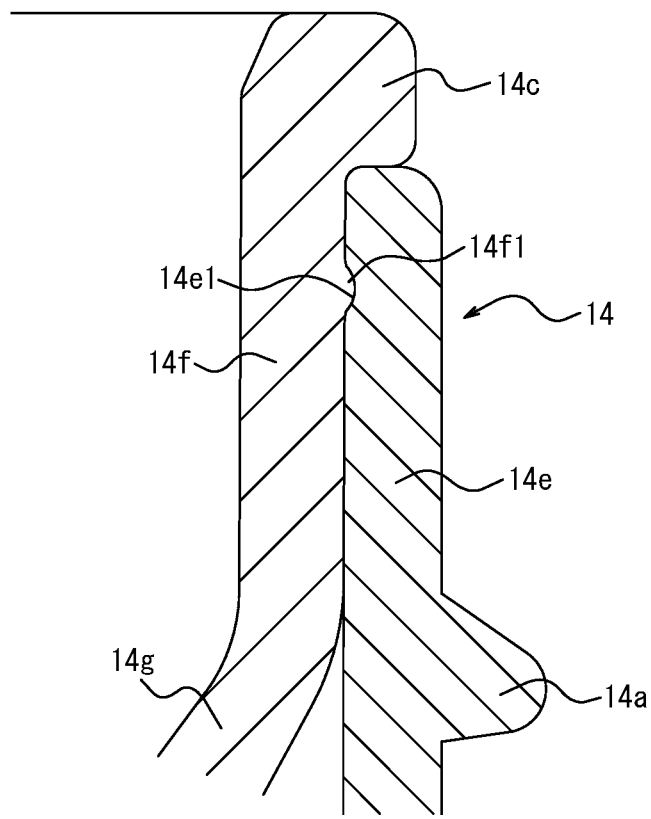
FIG. 3 is a detail view of part A in FIG. 2.

In the mouth 14, the inner body 13 is provided, at the upper end thereof, with a ring-shaped flange 14c protruding radially outward. Furthermore, as illustrated in FIG. 3, the large-diameter portion 14f of the inner body 13 is provided, on an outer surface thereof, with an annular projection 14f1 protruding radially outward. The annular projection 14f1 can engage with an annular groove 14e1 provided on the inner surface of the outer body 12. Additionally, it is also possible to provide the aforementioned annular projection 14f1 on the inner surface of the outer body 12 and to provide the annular groove 14e1 on the outer surface of the inner body 13. Furthermore, the annular groove 14e1 and the annular projection 14f1 may be provided in plurality in the vertical direction.

The outer body 12 is made of a synthetic resin material similar to that of the outer layer body 2, that is, polyethylene terephthalate (PET). The inner body 13 is also made of polyethylene terephthalate (PET), which is a synthetic resin material similar to that of the inner layer body 3. The inner body 13 is formed thinner than the outer body 12, and is laminated on the inner surface of the outer body 12 with a gap formed throughout except for the large-diameter portion, so as to cover the entire inner surface. In the laminated state, the entire or part of the inner body 13 may be in a close-contact state. Additionally, the inner body 13 may be configured to be thicker than the outer body 12. Furthermore, the inner body 13 may have a single layer structure made of only a single synthetic resin, or may have a structure made of a plurality of synthetic resins in order to improve its barrier properties and suitability for resisting the contents.

As illustrated in FIG. 2, a crystallized region 19 is formed below the ambient air introduction hole 14b in the inner body 13. The preform 11 according to the present disclosure includes the crystallized region 19 within a height range along the mouth 14 that extends from a lower end of the ambient air introduction hole 14b to a predetermined height below the neck ring 18, as illustrated in FIG. 2. As mentioned earlier, the crystallized region 19 is a region in a crystalline resin in which the degree of crystallization has been increased, for example, by slowly cooling the resin after heating. In the present embodiment, the degree of crystallization in the crystallized region 19 has been increased to the extent where whitening occurs in the inner body 13. Consequently, rigidity of the inner body 13 in the region is improved, and the inner body 13 is prevented from expanding radially outward during stretch blow molding, so that an air passage for ambient air can be preserved.

In the present embodiment, as illustrated in FIG. 2, the crystallized region 19 is configured to be formed within the height range extending from the lower end of the ambient air introduction hole 14b to the predetermined height below the neck ring 18. With this configuration, in the synthetic resin container 1 of FIG. 1, an air flow path can be easily preserved between the outer layer body 2 and the inner layer body 3 over the height region extending from the ambient air introduction hole 4b to below the neck ring 8, when the outer layer body 2 is restored by ambient air introduced through the ambient air introduction hole 4b. The present disclosure is, however, not limited to this example. The crystallized region 19 may be configured such that an upper end of the crystallized region 19 is positioned within a height range extending between an upper end of the connecting portion 14g and an upper end of the neck ring 18. With this configuration, the crystallized region 19 can be provided at least over a height region extending from the upper end of the neck ring 18 to the predetermined height below the neck ring 18. Accordingly, rigidity of the inner body 13 is increased in the unstretched region below the neck ring 18 that tends to expand radially outward due to high pressure air coming from the inside during stretch blow molding, whereby its radially outward expansion can be prevented. Furthermore, because the upper limit for the upper end of the crystallized region 19 is set to be the upper end of the connecting portion 14g, crystallization of the flange 14c and the annular projection 14/1 (refer to FIG. 3) in the preform 11 is prevented, whereby fitting properties between the outer body 12 and the inner body 13 can be improved. Additionally, a lower end of the crystallized region 19 may extend beyond the lower end of the mouth 14 to the trunk 15.

Preferably, the upper end of the crystallized region 19 is within a height range of the small-diameter portion 14h and above the neck ring 18. With this configuration, the upper limit of the crystallized region 19 can be set within the height range of the small-diameter portion 14h. Accordingly, crystallization of the flange 14c and the annular projection 14/1 (refer to FIG. 3) in the preform 11 is further prevented, whereby fitting properties between the outer body 12 and the inner body 13 can be improved.

More preferably, the ambient air introduction hole 14b is provided within the height range of the small-diameter portion 14h and above the neck ring 18, and the upper end of the crystallized region 19 is configured to be located at a height position between the lower end of the ambient air introduction hole 14b and the upper end of the neck ring 18. With this configuration, the upper limit for the crystallized region 19 can be limited to be within a region extending below the lower end of the ambient air introduction hole 14b. Accordingly, crystallization of the flange 14c and the annular projection 14/1 (refer to FIG. 3) in the preform 11 is prevented even more effectively, whereby fitting properties between the outer body 12 and the inner body 13 can be improved.

As illustrated in FIG. 2, the airflow ribs 19a are formed in the small-diameter portion 14h of the inner body 13. In the present embodiment, the airflow ribs 19a are formed to protrude radially outward from an outer peripheral surface of the small-diameter portion 14h in the mouth 14. The airflow ribs 19a are arranged in three positions on both the left and right sides in FIG. 2 and symmetrically with respect to the ambient air introduction hole 14b. Each airflow rib 19a extends from below the ambient air introduction hole 14b in the small-diameter portion 14h of the preform 11 downward beyond the neck ring 18 and the lower end of the crystallized region 19, as illustrated in FIG. 2. By thus forming the airflow ribs 19a at a height position including at least part of the crystallized region 19, rigidity of the inner body 13 in the crystallized region 19 is improved, and an air passage can therefore be preserved. Moreover, a larger air passage can be achieved through spaces between the airflow ribs 19a. Consequently, in the synthetic resin container 1 that has been formed by stretch blow molding the preform 11, ambient air that has been introduced through the ambient air introduction hole 4b can be smoothly supplied to the trunk 5.

Additionally, it is sufficient that the airflow ribs 19a be formed at a height position including at least part of the crystallized region 19.

Furthermore, although in the present embodiment the airflow ribs 19a are arranged in three positions on both the left and right sides and symmetrically with respect to the ambient air introduction hole 14b, the present disclosure is not limited to this example. It is sufficient that an airflow rib 19a is provided in at least one position, and the number, interval, and arrangement positions can be freely selected.

Next, a method for manufacturing the synthetic resin container 1 according to an embodiment of the present disclosure will be described.

FIG. 4 is a flowchart illustrating a procedure of performing the method for manufacturing the synthetic resin container 1 according to the present embodiment.

To start with, a method for forming the preform 11, which is to be stretch blow molded to manufacture the synthetic resin container 1, will be described. First, the outer body 12 illustrated in FIG. 2 is molded by injection molding (Step S101). Furthermore, while the outer body 12 is molded, the inner body 13 is molded by a separate injection molding process (Step S102).

Additionally, although molding of the outer body 12 is described as being followed by molding of the inner body 13 in FIG. 4, the molding order is not limiting, as the outer body 12 and the inner body 13 can be molded independently of each other. The outer body 12 and the inner body 13 may also be molded by other molding methods, such as compression molding, without being limited to injection molding.

Subsequently, the crystallized region 19 is formed in the inner body 13 that has been molded in Step S102 (Step S103). For example, after the inner body 13 has been injection molded and the inner body 13 has been rapidly cooled, the crystallized region 19 can be formed by reheating only a predetermined region extending from the lower end of the ambient air introduction hole 14b to below the neck ring 18 and then slowly cooling the predetermined region without performing forced cooling, such as fan cooling. To reheat only the predetermined region extending from the lower end of the ambient air introduction hole 14b to below the neck ring 18, for example, the entirety except for the predetermined region are masked before reheating. Alternatively, the crystallized region 19 may be formed during injection molding of the inner body 13, by slowly cooling only the predetermined region in a process where the resin is cooled from a molten state. In the present embodiment, a crystallization process is performed so that the degree of crystallization increases to the extent where whitening occurs in the crystallized region 19. The present disclosure is, however, not limited to this example. For example, the crystallized region 19 may be formed by conducting a crystallization process so that the crystallized region 19 has predetermined rigidity (longitudinal elastic modulus).

Next, an outer peripheral surface of the inner body 13 in which the crystallized region 19 has been formed in Step S103 is fitted onto an inner peripheral surface of the outer body 12, so as to form the preform 11 (Step S104). To form the preform 11, as illustrated in FIG. 3, the ring-shaped flange 14c, which protrudes radially outward from an upper end of the mouth 14 in the inner body 13, abuts against the open end of the outer body 12 from above, and the annular projection 14f1, which is formed on the outer surface of the large-diameter portion 14f in the inner body 13, engages with the annular groove 14e1, which is provided on the inner surface of the outer body 12. In this way, the inner body 13 is configured to be positioned relative to the outer body 12 in the vertical direction. The inner body 13 and the outer body 12 may be configured to be positioned relative to each other in the circumferential direction, for example, by fitting a convex portion formed in part of the outer peripheral surface of the inner body 13 in the circumferential direction into a concave portion formed in part of the inner peripheral surface of the outer body 12 in the circumferential direction.

Subsequently, the preform 11 that has been formed in Step S104 is stretch blow molded, to thereby produce the synthetic resin container 1, which is a container with separable laminated layers (Step S105). In stretch blow molding, part of the preform 11 that is to be stretched is first heated in a heating furnace. At this time, part of the mouth 14 that is not to be stretched may be coated with a heat insulating material or the like. After that, the preform 11 in the heated state is subject to stretch blow molding, with the neck ring 18 of the preform 11 being fixed to a blow molding mold by abutment against a reference plane of the blow molding mold. Consequently, the outer body 12 and the inner body 13 are blow molded radially outward by high pressure air, while being stretched downward by a stretching rod. Here, in the present embodiment, the crystallized region 19 having a high degree of crystallization and a high elastic modulus is provided in the unstretched part of the mouth 14 that extends from the lower end of the ambient air introduction hole 14b to below the neck ring 18, so that the region can be prevented from expanding radially outward due to high pressure air. Hence, an air passage for ambient air from the ambient air introduction hole 14b to the trunk 15 can be easily preserved.

Although in the present embodiment the mouth 4 and the trunk 5 have an approximately cylindrical shape, the present disclosure is not limited to this example. For example, the mouth 4 and the trunk 5 may have a rectangular tubular shape or an elliptical tubular shape. Similarly, although in the present embodiment the mouth 14 and the trunk 15 in the preform 11 have a substantially cylindrical shape, the present disclosure is not limited to this example. For example, the mouth 14 and the trunk 15 may have a rectangular tubular shape or an elliptical tubular shape.

As described above, a preform 11 according to the present embodiment includes an outer body 12 and an inner body 13 laminated on an inner surface of the outer body 12 and is used for stretch blow molding. The preform 11 includes a tubular mouth 14, a trunk 15 positioned below the mouth 14, and a bottom 16 that closes a lower end of the trunk 15. In the mouth 14, the inner body 13 includes a large-diameter portion 14f provided at an upper end thereof, and a small-diameter portion 14h continuously extending below the large-diameter portion 14f via a connecting portion 14g. In the mouth 14, the outer body 12 is provided with an ambient air introduction hole 14b passing through the outer body 12, and a neck ring 18 positioned within a height range of the small-diameter portion 14h. The inner body 13 is made of a crystalline resin, and a crystallized region 19 is formed in part of the inner body 13, the crystallized region 19 having a higher degree of crystallization than other regions. The crystallized region 19 has an upper end that is positioned within a height range extending between an upper end of the connecting portion 14g and an upper end of the neck ring 18. The crystallized region 19 has a lower end that is positioned below the neck ring 18. By adopting the above configuration, when the synthetic resin container 1 is formed by stretch blow molding the preform 11 including the outer body 12 and the inner body 13, the inner body 13, in part of the mouth 14, is prevented from expanding radially outward by high pressure air and causing narrowing of an air passage. Consequently, an air passage leading from the ambient air introduction hole 4b to the space between the outer layer body 2 and the inner layer body 3 in the trunk 5 can be easily preserved.

Furthermore, in the preform 11 according to the present embodiment, the upper end of the crystallized region 19 is positioned within the height range of the small-diameter portion 14h and above the neck ring 18. By adopting the above configuration, the upper limit of the crystallized region 19 can be set within the height range of the small-diameter portion 4h. Accordingly, crystallization of the flange 14c and the annular projection 14f1 in the preform 11 is further prevented, whereby fitting properties between the outer body 12 and the inner body 13 can be improved.

Moreover, in the preform 11 according to the present embodiment, the ambient air introduction hole 14b is provided within the height range of the small-diameter portion 14h and above the neck ring 18, and the upper end of the crystallized region 19 is located at a height position between a lower end of the ambient air introduction hole 14b and the upper end of the neck ring 18. By adopting the above configuration, the upper limit for the crystallized region 19 can be limited to a region extending below the lower end of the ambient air introduction hole 14b. Accordingly, crystallization of the flange 14c and the annular projection 14f1 in the preform 11 is prevented even more effectively, whereby fitting properties between the outer body 12 and the inner body 13 can be improved.

Moreover, in the preform 11 according to the present embodiment, the small-diameter portion 14h is provided with airflow ribs 19a that are formed intermittently in a circumferential direction and that protrude radially outward. By adopting the above configuration, rigidity of the inner body 13 in the crystallized region 19 is improved, and an air passage can therefore be preserved. Moreover, a larger air passage can be achieved through spaces between the airflow ribs 19a. Consequently, in the synthetic resin container 1 that has been formed by stretch blow molding the preform 11, ambient air that has been introduced through the ambient air introduction hole 4b can be smoothly supplied to the trunk 5.

Moreover, in the preform 11 according to the present embodiment, an outer surface of the large-diameter portion 14f is provided with an annular projection 14f1, and the inner surface of the outer body 12 is provided with an annular groove 14e1 that faces the annular projection 14f1. The inner body 13 is configured to be positioned relative to the outer body 12 in a vertical direction by engagement between the annular projection 14f1 and the annular groove 14e1. By adopting the above configuration, when the inner body 13 is fitted inside the outer body 12 so as to form the preform 11, the inner body 13 can be inserted by positioning it relative to the outer body 12 in the vertical direction.

Moreover, in the preform 11 according to the present embodiment, the crystallized region 19 is an unstretched part in the stretch blow molding. By adopting the above configuration, when the synthetic resin container 1 is formed by stretch blow molding the preform 11, the inner body 13, in the unstretched part of the mouth 14, is prevented from expanding radially outward by high pressure air and causing narrowing of an air passage. Consequently, an air passage leading from the ambient air introduction hole 4b to the space between the outer layer body 2 and the inner layer body 3 in the trunk 5 can be easily preserved.

A synthetic resin container 1 according to the present embodiment includes an outer layer body 2 and an inner layer body 3 separably laminated on an inner surface of the outer layer body 2 and is formed by stretch blow molding. The synthetic resin container 1 includes a tubular mouth 4, a trunk 5 positioned below the mouth 4, and a bottom that closes a lower end of the trunk 5. In the mouth 4, the inner layer body 3 includes a large-diameter portion 4f provided at an upper end thereof, and a small-diameter portion 4h continuously extending below the large-diameter portion 4f via a connecting portion 4g. In the mouth 4, the outer layer body 2 is provided with an ambient air introduction hole 4b passing through the outer layer body 2, and a neck ring 8 positioned within a height range of the small-diameter portion 4h. The inner layer body 3 is made of a crystalline resin, and a crystallized region 9 is formed in part of the inner layer body 3, the crystallized region 9 having a higher degree of crystallization than other regions. The crystallized region 9 has an upper end that is positioned within a height range extending between an upper end of the connecting portion 4g and an upper end of the neck ring 8. The crystallized region 9 has a lower end that is positioned below the neck ring 8. By adopting the above configuration, when the synthetic resin container 1 is formed by stretch blow molding the preform 11, the inner body 13, in part of the mouth 14, is prevented from expanding radially outward by high pressure air and causing narrowing of an air passage. Consequently, an air passage leading from the ambient air introduction hole 4b to the space between the outer layer body 2 and the inner layer body 3 in the trunk 5 can be easily preserved.

A method for manufacturing a synthetic resin container 1 according to the present embodiment is a method for manufacturing the synthetic resin container 1 by stretch blow molding a preform 11 including an outer body 12 and an inner body 13 laminated on an inner surface of the outer body 12. The preform 11 has a tubular mouth 14, and a trunk 15 positioned below the mouth 14, and a bottom 16 that closes a lower end of the trunk 15. In the mouth 14, the inner body 13 includes a large-diameter portion 14f provided at an upper end thereof, and a small-diameter portion 14h continuously extending below the large-diameter portion 14f via a connecting portion 14g. In the mouth 14, the outer body 12 is provided with an ambient air introduction hole 14b passing through the outer body 12, and a neck ring 18 positioned within a height range of the small-diameter portion 14h. The method includes molding the outer body 12 and the inner body 13 that is made of a crystalline resin, reheating and cooling part of the inner body 13, to thereby form a crystallized region 19 having a higher degree of crystallization than other regions, fitting the inner body 13 with the crystallized region 19 onto an inner peripheral surface of the outer body 12, to thereby form a preform 11, and stretch blow molding the preform 11, to thereby form a synthetic resin container 1. The crystallized region 19 has an upper end that is positioned within a height range extending between an upper end of the neck ring 18 and an upper end of the connecting portion 14g. The crystallized region 19 has a lower end that is positioned below the neck ring 18. By adopting the above configuration, when the synthetic resin container 1 is formed by stretch blow molding the preform 11, the inner body 13, in part of the mouth 14, is prevented from expanding radially outward by high pressure air and causing narrowing of an air passage. Consequently, an air passage leading from the ambient air introduction hole 4b to the space between the outer layer body 2 and the inner layer body 3 in the trunk 5 can be easily preserved.

Furthermore, in the method for manufacturing the synthetic resin container 1 according to the present embodiment, the cooling of the inner body 13 includes cooling at least part of the mouth 14 in the inner body 13 by slow cooling without forced cooling. With the above configuration including the simple step of slow cooling without forced cooling, the inner body 13, in part of the mouth 14, is prevented from expanding radially outward by high pressure air and causing narrowing of an air passage. Consequently, an air passage leading from the ambient air introduction hole 4b to the space between the outer layer body 2 and the inner layer body 3 in the trunk 5 can be easily preserved.

While the present disclosure has been described based on the drawings and examples, it should be noted that various changes and modifications may be implemented by those skilled in the art based on the present disclosure. Accordingly, such changes and modifications are to be understood as included within the scope of this disclosure. For example, functions or the like included in each component can be rearranged without logical inconsistency, and a plurality of components can be combined together or divided. These are to be understood as included in the scope of the present disclosure.

EXAMPLE

A preform 11 was prepared using IPA (isophthalic acid)-modified PET (IV value: 0.8) as a material for the outer body 12 and the inner body 13. Part (crystallized region 19) of the mouth 14 in which whitening had occurred had a density of 1.37 [g/cm$^3$], and any other part than the part in which whitening had occurred had a density of 1.33 [g/cm$^3$]. As for crystallization of the mouth 14, a density of greater than or equal to 1.35 [g/cm$^3$] was needed to enable ambient air to be introduced through the ambient air introduction hole 4b in the synthetic resin container 1 after stretching blow molding.

In a case in which a PET resin is used as a material of the outer body 12 and the inner body 13, in addition to the aforementioned IPA-modified PET, another PET resin, such as CHDM-modified PET or homo-PET, may also be used.

REFERENCE SIGNS LIST

1 Synthetic resin container
2 Outer layer body
3 Inner layer body
4 Mouth
4a Male thread
4b Ambient air introduction hole
4c Flange
4d Bead 4e Peripheral wall
4f Large-diameter portion
4g Connecting portion
4h Small-diameter portion
5 Trunk
7 Shoulder
8 Neck ring
9 Crystallized region
9a Airflow rib
10 Longitudinal rib
10B Lower end
10M Mid-height
10T Upper end
11 Preform
12 Outer body
13 Inner body
14 Mouth
14a Male thread
14b Ambient air introduction hole
14c Flange
14d Bead
14e Peripheral wall
14e1 Annular groove
14f Large-diameter portion
14f1 Annular projection
14g Connecting portion
14h Small-diameter portion
15 Trunk
16 Bottom
18 Neck ring
19 Crystallized region
19a Airflow rib
O1, O2 Central axis
S Container portion

The invention claimed is:

1. A synthetic resin preform that includes an outer body and an inner body laminated on an inner surface of the outer body and that is used for stretch blow molding, the synthetic resin preform comprising:
   a tubular mouth;
   a trunk below the mouth; and
   a bottom that closes a lower end of the trunk, wherein
   in the mouth, the inner body includes a large-diameter portion at an upper end thereof, and a small-diameter portion continuously extending below the large-diameter portion via a connecting portion,
   in the mouth, the outer body includes an ambient air introduction hole passing through the outer body, and a neck ring within a height range of the small-diameter portion,
   the inner body is made of a crystalline resin, and a crystallized region is in part of the inner body, the crystallized region having a higher degree of crystallization than other regions,
   the crystallized region has an upper end that is within a height range extending between an upper end of the connecting portion and an upper end of the neck ring, and
   the crystallized region has a lower end that is below the neck ring,
   the ambient air introduction hole is within a height range of the small-diameter portion and above the upper end of the neck ring, and
   the upper end of the crystallized region is at a height position between a lower end of the ambient air introduction hole and above the upper end of the neck ring.

2. The synthetic resin preform according to claim 1, wherein the upper end of the crystallized region is positioned within the height range of the small-diameter portion and above the neck ring.

3. The synthetic resin preform according to claim 1, wherein the small-diameter portion is provided with airflow ribs that are formed intermittently in a circumferential direction and that protrude radially outward.

4. The synthetic resin preform according to claim 1, wherein
   one of an outer surface of the large-diameter portion and the inner surface of the outer body is provided with an annular projection,
   another one of the outer surface of the large-diameter portion and the inner surface of the outer body is provided with an annular groove that faces the annular projection, and
   the inner body is configured to be positioned relative to the outer body in a vertical direction by engagement between the annular projection and the annular groove.

5. The synthetic resin preform according to claim 1, wherein the crystallized region is an unstretched part in the stretch blow molding.

* * * * *